United States Patent
Hao

(10) Patent No.: US 12,005,803 B2
(45) Date of Patent: Jun. 11, 2024

(54) SHARED WIRELESS CHARGING DOCKING STATION FOR UNMANNED AERIAL VEHICLES AND A PRIORITY-BASED WIRELESS CHARGING METHOD

(71) Applicant: SHANGHAI LUBIKANG ENERGY TECHNOLOGY CO., LTD., Shanghai (CN)

(72) Inventor: Peng Hao, Shanghai (CN)

(73) Assignee: SHANGHAI LUBIKANG ENERGY TECHNOLOGY CO., LTD., Shanghai (CN)

( * ) Notice: Subject to any disclaimer, the term of this patent is extended or adjusted under 35 U.S.C. 154(b) by 728 days.

(21) Appl. No.: 17/263,541

(22) PCT Filed: Sep. 6, 2018

(86) PCT No.: PCT/CN2018/104277
§ 371 (c)(1),
(2) Date: Jan. 26, 2021

(87) PCT Pub. No.: WO2020/019413
PCT Pub. Date: Jan. 30, 2020

(65) Prior Publication Data
US 2021/0229566 A1    Jul. 29, 2021

(30) Foreign Application Priority Data

Jul. 26, 2018 (CN) .......................... 201810832341.3

(51) Int. Cl.
*B60L 53/68* (2019.01)
*B60L 53/12* (2019.01)
(Continued)

(52) U.S. Cl.
CPC ............... *B60L 53/68* (2019.02); *B60L 53/12* (2019.02); *B60L 53/66* (2019.02); *B60L 53/67* (2019.02);
(Continued)

(58) Field of Classification Search
CPC ............ B60L 53/35–39; B60L 2200/10; H02J 2310/44
See application file for complete search history.

(56) References Cited

U.S. PATENT DOCUMENTS

2020/0290752 A1*  9/2020  Kolosiuk ............... B64D 39/06

FOREIGN PATENT DOCUMENTS

| CN | 105790350 A | * 7/2016 | ............. B60L 53/60 |
| CN | 105790350 A |   7/2016 | |

(Continued)

OTHER PUBLICATIONS

Machine translation of CN-105790350-A (Year: 2023).*

*Primary Examiner* — David V Henze-Gongola
(74) *Attorney, Agent, or Firm* — Bayramoglu Law Offices LLC

(57) ABSTRACT

A shared wireless charging docking station for an unmanned aerial vehicle, including an adjacent docking station communication module, a communication function module, a control center communication module, an unmanned aerial vehicle communication module, a central processing unit, a connection actuator, a wireless power transmitter, and a power management and load unit. According to the shared wireless charging docking station and a priority-based wireless charging method applied to the wireless shared docking station, a wireless charging shared service for an unmanned aerial vehicle is provided to satisfy the requirements for charging and endurance of unmanned aerial vehicles used in different industries, such as power line patrol unmanned (Continued)

aerial vehicles, oil pipeline patrol unmanned aerial vehicles, border line patrol unmanned aerial vehicles and mobile phone base station patrol unmanned aerial vehicles.

20 Claims, 1 Drawing Sheet

(51) Int. Cl.
  *B60L 53/66* (2019.01)
  *B60L 53/67* (2019.01)
  *B64C 39/02* (2023.01)
  *B64U 50/19* (2023.01)

(52) U.S. Cl.
  CPC ......... *B64C 39/024* (2013.01); *B60L 2200/10* (2013.01); *B64U 50/19* (2023.01)

(56) References Cited

FOREIGN PATENT DOCUMENTS

| | | | |
|---|---|---|---|
| CN | 106921193 A | 7/2017 | |
| CN | 107531326 A | 1/2018 | |
| EP | 3081486 A1 | 10/2016 | |

* cited by examiner

SHARED WIRELESS CHARGING DOCKING STATION FOR UNMANNED AERIAL VEHICLES AND A PRIORITY-BASED WIRELESS CHARGING METHOD

CROSS REFERENCE TO THE RELATED APPLICATIONS

This application is the national phase entry of International Application No. PCT/CN2018/104277, filed on Sep. 6, 2018, which is based upon and claims priority to Chinese Patent Application No. 201810832341.3, filed on Jul. 26, 2018, the entire contents of which are incorporated herein by reference.

TECHNICAL FIELD

The present invention belongs to the field of unmanned aerial vehicles, and more particularly, relates to a shared wireless charging docking station for unmanned aerial vehicles and a priority-based charging method.

BACKGROUND

In recent years, the emergence of unmanned aerial vehicles has greatly enriched people's daily life. For example, unmanned aerial vehicles are used in aerial photography, bringing a lot fun to users, such as personal photography, static photography and dynamic photography, Moreover, in industrial applications, unmanned aerial vehicles are also applied into surveillance work, such as inspection of oil pipelines. Normally, people need to go deep into the wilderness, such as patrolling along the oil pipelines over and over again. Such work requires operators to come to the scene driving cars or other by means of transportation. Sometimes, the operators even have to take a risk of climbing up to dozens of meters of telegraph towers.

Unmanned aerial vehicles can be remotely controlled to fly along pre-set routes autonomously or to the corresponding regions, in order to take photographs and transmit real-time data to a master control center. This greatly saves manpower and contributes to dramatic cost-down.

However, unmanned aerial vehicles have a significant technical bottleneck of flight ranges due to their limited on board battery. Generally, consumer unmanned aerial vehicles are driven by limited lithium battery, which enables airborne no more than twenty minutes, while industrial unmanned aerial vehicles mostly have an airborne time about thirty minutes. Additionally, unmanned aerial vehicles typically have self-protection functions and, therefore would return automatically after flying when half of the airborne time. In this case, the unmanned aerial vehicles have an effective working time of only about 20 minutes, or even less.

Compared with conventional batteries such as mobile phone batteries, batteries used in unmanned aerial vehicles are more expensive, and have higher density and thus weigh more. For industrial unmanned aerial vehicles, an airborne time of about half an hour is a compromise based on the comprehensive consideration of the take-off weight, flight attitude, and other factors. In other words, it would be improbable to artificially increase the airborne batteries in an attempt to obtain a longer airborne time or a longer flight range.

Even if, in the foreseeable future, a breakthrough is made in the unmanned aerial vehicle batteries so that the unmanned aerial vehicles would have a significantly improved airborne time. Such a breakthrough, however, may be insufficient to support the unmanned aerial vehicles to continuously fly for hours or even a whole day. At the same time, other emerging new unmanned aerial vehicle airborne devices have accelerated power consumption, for example, AI-based autonomous flight, obstacle avoidance and other functions may consume a substantial power of the airborne battery. All these limitations make it difficult to solve the problem of endurance of unmanned aerial vehicles simply from the perspective of improving battery performance.

Therefore, in the unmanned aerial vehicle industry, especially those in industrial applications, it is highly desirable to provide a method capable of greatly prolonging the airborne time of battery-driven unmanned aerial vehicles.

SUMMARY

Technical Problem

Unmanned aerial vehicles have limited flight ranges due to limitations on their batteries, and have a constrained airborne time that ranges from a few minutes to roughly twenty minutes.

Technical Solution

In order to solve the above-mentioned problems, as shown in FIG. 1, the present invention provides a shared wireless charging docking station for an unmanned aerial vehicle, including a docking station and an adjacent docking station communication module 1-1. The adjacent docking station communication module 1-1 is in a two-way communication with a communication function module 1-3. The communication function module 1-3 is in a two-way communication with a control center communication module 1-2, an unmanned aerial vehicle communication module 1-4, and a central processing unit 1-6, respectively. The central processing unit 1-6 is further in a two-way communication with a connection actuator 1-5, a wireless power transmitter 1-7, and a power management and load unit 1-8. The power management and load unit 1-8 is in a one-way communication with the wireless power transmitter 1-7.

Put simply, a docking station wireless charging system mainly implements three functions as follows:
1) information interaction with different systems, that is, communications, implemented by, for example, the adjacent docking station communication module, the control center communication module, the communication function module, and the unmanned aerial vehicle communication module in FIG. 1;
2) coordination of the collaboration among units, implemented by a system management unit such as the central processing unit in FIG. 1; and
3) a particular task, implemented by an actuator unit such as the connection actuator, the wireless power transmitter, and the power management and load unit in FIG. 1.

Each module or unit is described in detail below.

The adjacent docking station communication module is configured to establish a communication connection between a current docking station and at least one adjacent docking station in a wireless or wired manner, for example, through a cellular network, narrowband Internet of Things (NB-IoT), or other feasible wireless communication manners.

The control center communication module is configured to monitor, in real time, state information regarding all docking stations and unmanned aerial vehicles in a wireless or wired manner, for example, through a cellular network, NB-IoT, or other feasible wireless communication manners.

The communication function module is a collective name for interactive functions of the docking station. The communication function module includes a cable, optical fibers or the like to implement wired communication and/or includes a cellular network, NB-IoT, Bluetooth, ZigBee or the like to implement wireless communication or other feasible wireless communications. The interactive functions are used to implement communication and information interaction with the control center, other docking stations, and the unmanned aerial vehicles.

The unmanned aerial vehicle communication module is configured to implement information interaction between the unmanned aerial vehicles directly in a wireless manner such as a cellular network, NB-IoT, Bluetooth, ZigBee, and other feasible wireless communications or through transmission by the docking station and/or the control center to implement functions such as obstacle avoidance and competitive landing.

The connection actuator is an auxiliary actuator configured for the docking station to assist the unmanned aerial vehicle in landing in a designated region, thereby improving the efficiency of wireless charging of the unmanned aerial vehicle.

The connection actuator 1-5 moves from a vicinity of the edge of the docking station in a two-dimensional manner and performs a parallel motion in a horizontal direction and/or a vertical direction to a vicinity of the edge of an effective region until the unmanned aerial vehicle is caught and locked. The connection actuator 1-5 is further configured to remove snow and debris. A stop position of the connection actuator 1-5 is located on the other side of the docking station opposite to a start position of the connection actuator. In this process, the connection actuator moves in the horizontal direction and the vertical direction non-simultaneously.

The central processing unit is configured to perform data processing and functional implementation with other units.

The wireless power transmitter is based on the magnetic resonance wireless charging technology and uses alternating electrical signals to generate an alternating magnetic field, and the alternating magnetic field has a particular magnetic-field intensity and a particular electric-field intensity within a specific range. When an unmanned aerial vehicle lands within this specific region of the docking station, that is, an effective region of wireless charging, a wireless power receiver of the unmanned aerial vehicle can receive the energy efficiently.

The power management and load unit acquires electric energy directly from an infrastructure to which the docking station is fixed, such as a power tower, a mobile phone base station or the like, or acquires electric energy from other sources such as solar energy. The power management and load unit is configured to manage the effective acquisition and output of the electric energy. In addition, the power management and load unit also has adequate protection functions, including but not limited to, overvoltage, overcurrent and overload protection, lightning protection, and the like.

Besides, the docking station further has basic self-maintenance functions. Field conditions faced by the docking station and its autonomous treatment include (but are not limited to):

1) Debris such as stones carried by the wind, large pieces of bird droppings, and winter snow. The docking station performs the corresponding treatment through the connection actuator unit.
2) Snow and ice. In addition to the physical treatment in 1), for possible stubborn snow or ice, the docking station enables the wireless power transmitter to work and controls the output power of the wireless power transmitter without load, so that the wireless power transmitter generates a certain amount of heat to melt the snow and ice, and cooperates with the connection actuator to clean the snow and remove the ice.

As shown in FIG. 2, the unmanned aerial vehicle includes a control center module 2-1. The control center module 2-1 is in a two-way communication with a communication module 2-3. The communication module 2-3 is in a two-way communication with a docking station interaction module 2-2, a module 2-4 for interacting with other unmanned aerial vehicles, and a central processing unit 2-6, respectively. The central processing unit 2-6 is in a two-way communication with a flight control module 2-5, a wireless power receiver 2-7, and a power management and load unit 2-8. The power management and load unit 2-8 is in a two-way communication with the wireless power receiver 2-7.

In FIG. 2, the unmanned aerial vehicle communicates and interacts with the docking station, the control center, and/or other adjacent unmanned aerial vehicles, lands within an effective region of the docking station, then is wirelessly charged, and finally takes off after being fully charged. Functional units involved in this process are described as follows.

The control center module is configured to implement real-time interaction between the unmanned aerial vehicle and the control center. On the one hand, the unmanned aerial vehicle transmits data including captured images/videos to the control center in a wireless manner such as a cellular network, NB-IoT, or other feasible wireless communications. On the other hand, the unmanned aerial vehicle also receives instructions from the control center, new missions.

The docking station interaction module is configured to implement information interaction such as mutual system identification and wireless charging states between the unmanned aerial vehicle and the docking station in a wireless manner such as a cellular network, NB-IoT, Bluetooth, or other feasible wireless communications.

The communication module is a collective name for the interactive functions of the unmanned aerial vehicle. Generally, the module is based on a wireless manner, such as a cellular network, NB-IoT, Bluetooth, ZigBee, or other feasible wireless communications, and may also adopt a wired manner in particular cases such as cables. The interactive functions are used to implement information interaction with the control center, docking stations, and other unmanned aerial vehicles.

The module for interacting with other unmanned aerial vehicles is configured to enable mutual communication among unmanned aerial vehicles in a wireless manner, such as a cellular network, NB-IoT, Bluetooth, ZigBee, or other feasible wireless communications, or in a wired manner in particular cases (such as cables). Mutual interaction information includes (but is not limited to), battery level information, position information, and so on.

The central processing unit is configured to perform functional implementation with other units.

The wireless power receiver is also based on magnetic resonance wireless charging technology. When in an alternating magnetic field, the wireless power receiver receives magnetic field energy via a coil unit and converts the magnetic field energy into stable DC voltage and DC current by a signal conditioning unit to supply power to the load unit. When an unmanned aerial vehicle lands within a specific region of the docking station, that is, an effective region of wireless charging, a wireless power receiver of the unmanned aerial vehicle can receive the energy efficiently.

Since the load may be a battery or a battery pack, the power management and load unit is provided in consideration of the charging characteristics of the battery. This unit is configured to guarantee a safe charging process of the battery. Moreover, this unit also has adequate protection functions, including but not limited to, overvoltage, overcurrent and overload protection, lightning protection, and the like.

The present invention further provides a priority-based wireless charging method applied to the shared wireless charging docking station for the unmanned aerial vehicle, including the following steps: step 1: enabling the docking station to be in a standby mode;

step 2: when there is a charging request from an unmanned aerial vehicle, performing an identification on the unmanned aerial vehicle by the docking station;

step 3: allowing the unmanned aerial vehicle to be ready for landing if the identification succeeds;

step 4: determining, by the docking station, whether there is a charging request from a new unmanned aerial vehicle within a period of time; if not, proceeding to the next step; if yes, keeping the two or more unmanned aerial vehicles from actually entering a landing mission or a subsequent mission, performing a priority level assessment, accepting an actual charging request from only one unmanned aerial vehicle, regarding other unmanned aerial vehicles as non-ready-for-landing unmanned aerial vehicles, and proceeding to the next step if the charging request from the previous unmanned aerial vehicle is accepted after the priority level assessment, wherein the non-ready-for-landing unmanned aerial vehicles perform an airborne time determination and choose to land nearby to queue up or fly to an adjacent docking station for charging; if the charging request from the new unmanned aerial vehicle is accepted after the priority level assessment, the docking station updates a ready-for-landing instruction to enable the new unmanned aerial vehicle to enter a ready-for-landing state, and the non-ready-for-landing unmanned aerial vehicles perform an airborne time determination and choose to land nearby to queue up or fly to an appropriate adjacent docking station for charging;

step 5: allowing the unmanned aerial vehicle to land in an effective region on the docking station, and locking the unmanned aerial vehicle by the connection actuator;

step 6: allowing the unmanned aerial vehicle to turn off the engine of the unmanned aerial vehicle, and wirelessly charging the unmanned aerial vehicle by the docking station; and step 7: allowing the unmanned aerial vehicle to start the engine of the unmanned aerial vehicle after the unmanned aerial vehicle is fully charged, notifying the docking station, allowing the unmanned aerial vehicle to be ready for taking off, unlocking, by the docking station, the connection actuator after the docking station receives a notification, and allowing the unmanned aerial vehicle to take off.

The airborne time determination for the unmanned aerial vehicles includes the following two situations: (1) when battery level is sufficient, the unmanned aerial vehicle flies to another suitable docking station for charging; and (2) when the docking station and/or the unmanned aerial vehicle determine/determines that the residual battery level of the unmanned aerial vehicle is insufficient to support the unmanned aerial vehicle to fly to other adjacent docking stations, the unmanned aerial vehicle chooses to land nearby, after landing, the unmanned aerial vehicle stops main rotors or all rotors, and the unmanned aerial vehicle enters a standby state, interacts with the docking station in real time, and applies for charging.

When an adjacent docking station interacts with a current docking station, the availability of the adjacent docking station is determined by the following three conditions: 1) whether the adjacent docking station is in a normal functional state, 2) there is no unmanned aerial vehicle charging on the adjacent docking station, and 3) the battery level of the unmanned aerial vehicle is sufficient to support the unmanned aerial vehicle to fly to the adjacent docking station, and when the unmanned aerial vehicle flies to the adjacent docking station satisfying the conditions, step 2 to step 7 are repeated.

In step 3, when the identification of the unmanned aerial vehicle fails over a pre-set maximum number of consecutive identification failures, the docking station denies landing of the unmanned aerial vehicle and requires the unmanned aerial vehicle to leave, wherein the maximum number is predetermined.

In step 5, the connection actuator pushes the unmanned aerial vehicle to the effective region, and when the unmanned aerial vehicle fails to land in or partially lands within the effective region and the connection actuator fails, within a period of time, the unmanned aerial vehicle takes off slightly and finely tunes the landing point through re-landing to land in the effective region; and interaction between the unmanned aerial vehicle and the docking station is maintained during the period of time.

In step 6, when there is a charging application from a new unmanned aerial vehicle, the new unmanned aerial vehicle directly performs an airborne time determination and chooses to land nearby to queue up or fly to an adjacent docking station for charging.

A docking station sub-system is started, that is, a power supply is switched on. The power supply is directly derived from a preset power output mode, such as a power line, a power supply from a mobile phone base station, or even solar power.

It is determined whether state parameters of the docking station are normal. These parameters include (but are not limited to): an operating voltage, a current, weather conditions such as an ambient temperature and an ambient wind speed, a state of debris on the surface of the docking station, an internal temperature of the docking station, a state of an interactive function module, a state of the connection actuator unit, a state of the wireless power transmitter, and a state of the power management unit.

The standby mode of the docking station regularly would search for potential unmanned aerial vehicles. Particularly, the landing and charging requests from unmanned aerial vehicles, or the control information sent from the control center.

The docking station determines whether the request for landing and charging the unmanned aerial vehicle has been received. The request is obtained in a wireless manner, and wireless charging methods for the docking station include (but are not limited to): cellular networks such as 2G, 3G, 4G, 5G and upgrades or derivatives thereof, NB-IoT, Bluetooth, infrared, Beidou positioning, and GPS. The above methods may be used alone, or at least two of them are used in combination.

When receiving a charging application from an unmanned aerial vehicle, the docking station performs an identification on the unmanned aerial vehicle to determine whether the unmanned aerial vehicle has a qualification for landing. The qualification for landing means that the unmanned aerial vehicle belongs to the same organization as the docking station, or that the unmanned aerial vehicle is able to land due to the related agreement under the same organization. Different organizations may lead to diversity in size and weight, so that landing could be impossible in the first place. In addition, the unmanned aerial vehicle has a wireless power receiver that matches the wireless power transmitter of the docking station. In practical operation, this charging can be commercialized.

Successful identification means that the unmanned aerial vehicle has the qualification for landing and the wireless power receiver of the unmanned aerial vehicle matches the wireless power transmitter of the docking station. The identification process may not succeed the first time. In the present invention, a maximum allowable number of consecutive identification attempts is set, such as three. When it is determined that the unmanned aerial vehicle has no qualification for landing or the maximum allowable number is exceeded, the docking station denies landing of the unmanned aerial vehicle and requires the unmanned aerial vehicle to leave.

Preparations for landing. The unmanned aerial vehicle is ready for landing, and the specific work of the preparations for landing involves the unmanned aerial vehicle and the docking station, and specifically includes (but is not limited to):

1) For the unmanned aerial vehicle: a flight control unit adjusts the flight attitude and the flight speed, and the unmanned aerial vehicle interacts with the docking station and the control center module in real time.
2) For the docking station: the connection actuator and the wireless power transmitter enter a ready state.

After determining that one unmanned aerial vehicle has entered a ready-for-landing stage, the docking station may still interact with other unmanned aerial vehicles within a certain range.

When two or more unmanned aerial vehicles appear at the same time and none of them actually enter a landing mission or a subsequent mission, the docking station needs to perform a determination among these identified unmanned aerial vehicles, that is, accept an actual charging request from only one of these unmanned aerial vehicles. The determination process is priority level assessment, that is, to determine an unmanned aerial vehicle that needs to be charged the most.

The priority level assessment is mainly based on the following three parameters:

(1) a residual battery level of the unmanned aerial vehicle, wherein a smaller residual battery level indicates a higher priority level of landing and charging;
(2) assessment of a time required by full charge, wherein the time required by full charge is taken into consideration since airborne batteries of various unmanned aerial vehicles vary in capacity; a shorter time required by full charge indicates a higher priority level; in other words, it is encouraged to charge unmanned aerial vehicles as many times as possible to deal with scenarios where there is no docking station available for charging; and
(3) a distance between the unmanned aerial vehicle and the docking station, wherein the distance is corrected by using a satellite positioning system such as Beidou and/or GPS in conjunction with signal strength in a wireless process (for example, a cellular network, NB-IoT, Bluetooth, ZigBee, and other feasible wireless communications) between the unmanned aerial vehicle and the docking station. Generally, a closer distance between the unmanned aerial vehicle and the docking station indicates higher signal strength of the docking station and a higher priority level.

The above three parameters have different weights, which are generally 60%, 30% and 10%, respectively. The docking station determines the sum of the three weighted parameters, and the largest data value indicates the highest priority level. The weight parameters are predetermined, but the sum thereof should be equal to 100%.

The docking station determines an unmanned aerial vehicle with a high priority level from candidate unmanned aerial vehicles. The unmanned aerial vehicle may not be the first unmanned aerial vehicle identified, and thus the docking station needs to update the related information.

For non-ready-for-landing unmanned aerial vehicles, there are two possibilities as follows: (1) when battery level is sufficient, the unmanned aerial vehicle flies to another suitable docking station for charging; or (2) the unmanned aerial vehicle chooses an appropriate landing point nearby to land to save battery level, interacts with the docking station in real time, and applies for charging. Therefore, after the identification of the unmanned aerial vehicle by the docking station, the docking station and the unmanned aerial vehicle or one of the docking station and the unmanned aerial vehicle need to determine the residual airborne time of the unmanned aerial vehicle, so that the unmanned aerial vehicle can be charged as soon as possible and safely.

When the docking station and/or the unmanned aerial vehicle determine/determines that the residual battery level of the unmanned aerial vehicle is insufficient to support the unmanned aerial vehicle to fly to other adjacent docking stations, the unmanned aerial vehicle chooses to land nearby. After landing, the unmanned aerial vehicle stops main rotors or all rotors, and the unmanned aerial vehicle enters a standby state and sends state information to the control center in real time.

After landing nearby, the unmanned aerial vehicle maintains wireless communication with the docking station, sends a charging application to the docking station regularly or irregularly, and receives an instruction regularly or irregularly from the docking station.

After a current docking station interacts with an adjacent docking station, it is determined whether the adjacent docking station can receive an unmanned aerial vehicle for charging by determining whether the adjacent docking station satisfies at least the following three conditions; 1) whether the adjacent docking station is in a normal functional state; 2) no unmanned aerial vehicle is being charged; and 3) the battery level of the unmanned aerial vehicle is sufficient to support the unmanned aerial vehicle to fly to the adjacent docking station.

The unmanned aerial vehicle enters a landing mode, and the central processing unit instructs the flight control unit, so that the unmanned aerial vehicle lands on the docking station.

The effective region refers to a region defined by a transmitting coil module in the wireless power transmitter. Generally, when the unmanned aerial vehicle lands within the effective region, the wireless charging efficiency remains at a high level; if the unmanned aerial vehicle partially lands within the effective region, the efficiency is weakened; if the unmanned aerial vehicle lands outside the region, the unmanned aerial vehicle cannot be charged wirelessly. An algorithmic determination is mainly based on a coupling degree of magnetic resonance wireless charging.

In order to facilitate wirelessly charging unmanned aerial vehicles that have already landed as quickly and efficiently as possible, the connection actuator of the docking station functions to mechanically push the unmanned aerial vehicle to the effective region.

The unmanned aerial vehicle takes off slightly and finely tunes the landing point. When the unmanned aerial vehicle fails to land in or partially lands within the effective region and the connection actuator fails, within a period of time, the unmanned aerial vehicle takes off slightly and finely tunes the landing point through re-landing to land in the effective region; and interaction between the unmanned aerial vehicle and the docking station is maintained during the period of time.

The connection actuator locks the unmanned aerial vehicle. In this case, the unmanned aerial vehicle is fixed to ensure that in the charging process, the unmanned aerial vehicle will not shift to avoid affecting charging.

The unmanned aerial vehicle stops the engine and prepares for charging. The unmanned aerial vehicle stops all engines, and other main actuators therein. The system enters a standby mode, and the wireless power receiver of the unmanned aerial vehicle is ready for charging. During the charging process of the unmanned aerial vehicle, new unmanned aerial vehicles may enter the edge of the docking station and apply for charging. In this case, instead of comparing and determining the priority levels between other unmanned aerial vehicles and the unmanned aerial vehicle being charged, the docking station directly assesses the residual airborne time of the new unmanned aerial vehicle to determine whether to land on-site or fly to other docking stations.

The docking station wirelessly charges the unmanned aerial vehicle. The wireless power transmitter of the docking station is the wireless power receiver of the unmanned aerial vehicle, and wireless charging is performed based on a magnetic resonance wireless charging method. The power management and load unit of the unmanned aerial vehicle determines in real time whether the unmanned aerial vehicle is fully charged. If not, charging is continued.

After being fully charged, the unmanned aerial vehicle starts its engine, notifies the docking station, and prepares for taking off. After receiving a notification, the docking station unlocks the connection actuator, that is, the connection actuator releases the unmanned aerial vehicle and returns to the starting position, namely the edge of the docking station. The unmanned aerial vehicle takes off, and reports, in real time, state information regarding the unmanned aerial vehicle and the docking station to the control center.

If the connection actuator fails to unlock at this time the system allows the connection actuator to make a maximum number of consecutive attempts within a period of time, such as three. The number is predetermined. If the connection actuator still fails to unlock after making the maximum number of attempts within a period of time, the unmanned aerial vehicle fails to take off, and the docking station is in a failure state and does not receive any application for charging through on-site instructions of information such as lights. In addition, the state information regarding the unmanned aerial vehicle and the docking station is reported in real time to the control center.

Advantages

The present invention provides a shared wireless charging docking station for an unmanned aerial vehicle and a priority-based wireless charging method. On the basis of the charging docking station, a wireless charging shared service for an unmanned aerial vehicle is provided to satisfy the requirements for charging and endurance of unmanned aerial vehicles used in different industries, such as power line patrol unmanned aerial vehicles, oil pipeline patrol unmanned aerial vehicles, border line patrol unmanned aerial vehicles and mobile phone base station patrol unmanned aerial vehicles. An unmanned aerial vehicle is able to carry out all-weather patrol inspection without manpower on-site maintenance. This greatly reduces the costs of patrol inspection and maintenance while improving the efficiency.

DETAILED DESCRIPTION OF THE EMBODIMENTS

Embodiment 1

Figure 1:
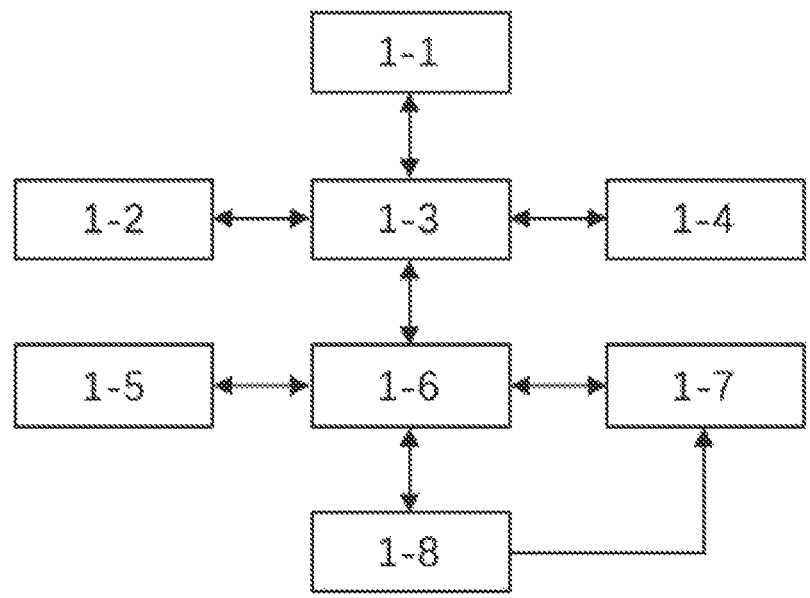
FIG. 1 is a schematic diagram of the working principle of a docking station.
Figure 2:
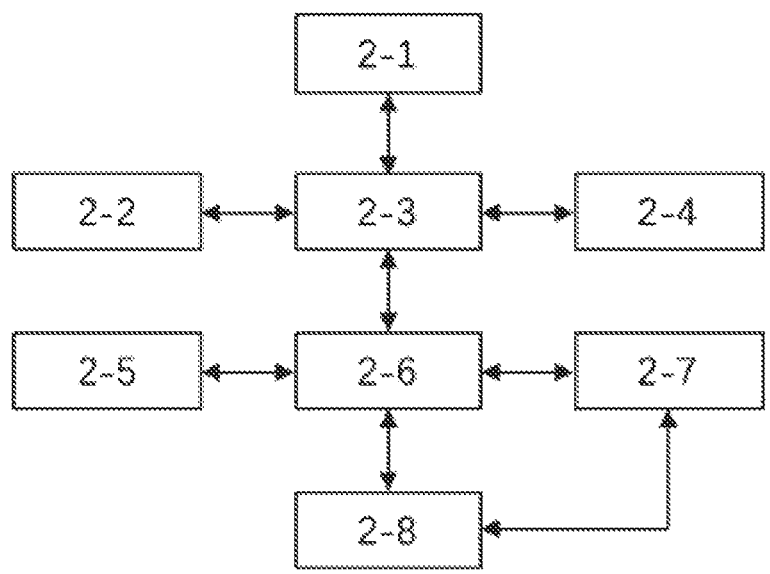
FIG. 2 is a schematic diagram of the working principle of an unmanned aerial vehicle.

A docking station for an unmanned aerial vehicle is installed on a suburban power tower. The docking station is provided with a wireless power transmitter based on magnetic resonance wireless charging and a connection actuator. The docking station not only can serve patrol unmanned aerial vehicles of power companies, but also can be shared with other patrol unmanned aerial vehicles working in this area, such as (but not limited to): oil and gas pipeline patrol, border line patrol, mobile phone base station patrol, animal migration patrol, and security patrol.

In case of no unmanned aerial vehicle, routine maintenance of the surface of the docking station, including debris removal, snow removal and ice removal in winter, is performed through the connection actuator.

In a time period, three unmanned aerial vehicles matching the wireless power transmitter of the docking station appear nearby and require to land for charging. All three unmanned aerial vehicles interact wirelessly with the docking station, and the docking station performs a determination according to the residual battery level, the time required by full charge, and distances from each other provided by the three unmanned aerial vehicles based on a priority algorithm. An unmanned aerial vehicle with the highest priority level is allowed to land and charged, while other unmanned aerial vehicles either land nearby to queue up or fly to other adjacent docking stations available for charging.

For an unmanned aerial vehicle not belonging to the power companies, a service payment may be charged after using the charging function of the docking station.

In the whole process above, both the unmanned aerial vehicle and the docking station interact with the control center in real time, respectively.

Industrial Applicability

The present invention provides a shared wireless charging docking station for an unmanned aerial vehicle and a priority-based wireless charging method. On the basis of the charging docking station, a wireless charging shared service for an unmanned aerial vehicle is provided to satisfy the requirements for charging and endurance of unmanned aerial vehicles used in different industries, such as power line patrol unmanned aerial vehicles oil pipeline patrol unmanned aerial vehicles, border line patrol unmanned aerial vehicles and mobile phone base station patrol unmanned aerial vehicles An unmanned aerial vehicle is able to carry out all-weather patrol inspection without manpower on-site maintenance. This greatly reduces the costs of patrol inspection and maintenance, and improves the efficiency of patrol inspection.

What is claimed is:

1. A shared wireless charging docking station for a plurality of unmanned aerial vehicles, comprising
   a plurality of docking stations and an adjacent docking station communicator;
   wherein the plurality of unmanned aerial vehicles comprise a first unmanned aerial vehicle, a plurality of second unmanned aerial vehicles and a third unmanned aerial vehicle;
   the plurality of docking stations comprise a first docking station and an adjacent docking station;
   the adjacent docking station communicator is in a two-way communication with a communication function system;
   the communication function system is in a two-way communication with a control center-communication monitor, an unmanned aerial vehicle communicator, and a first central processing unit, respectively;
   the first central processing unit is further in a two-way communication with a connection actuator, a wireless power transmitter, and a first power supply;
   the first power supply is in a one-way communication with the wireless power transmitter;
   the adjacent docking station communicator is configured to establish a communication with the adjacent docking station;
   the control center communication monitor is configured to monitor, in real time, state information regarding the plurality of docking stations and the plurality of unmanned aerial vehicles;
   the communication function system is configured to implement a communication and an information interaction with the control center communication monitor, the plurality of docking stations, and the plurality of unmanned aerial vehicles;
   the unmanned aerial vehicle communicator is configured to implement an information interaction between the plurality of unmanned aerial vehicles directly in a wireless manner or through transmission by the plurality of docking stations and/or a control center to avoid obstacles and facilitate competitive landing;
   the connection actuator is configured to assist the plurality of unmanned aerial vehicles in landing within a designated region;
   the first central processing unit is configured to perform data processing and functional implementation with the plurality of docking stations, the plurality of unmanned aerial vehicles, the connection actuator, the wireless power transmitter and the first power supply;
   the wireless power transmitter uses alternating electrical signals to generate an alternating magnetic field, and the alternating magnetic field has a magnetic-field intensity and an electric-field intensity within a range for charging the plurality of unmanned aerial vehicles; and
   the first power supply acquires electric energy directly from an infrastructure or the first power supply acquires the electric energy from solar energy, wherein the plurality of docking stations are fixed to the infrastructure, and the first power supply is configured to manage an effective acquisition and an output of the electric energy.

2. The shared wireless charging docking station according to claim 1, wherein
   the connection actuator moves from a vicinity of an edge of the first docking station in a two-dimensional manner and performs a parallel motion in a horizontal direction or a vertical direction to a vicinity of an edge of an effective region until the first unmanned aerial vehicle is caught and locked;
   the connection actuator is further configured to remove snow and debris;
   a stop position of the connection actuator is located on a side of the first docking station, wherein the side of the first docking station is opposite to a start position of the connection actuator; and
   the connection actuator moves in the horizontal direction and the vertical direction non-simultaneously.

3. The shared wireless charging docking station according to claim 1, wherein
   the first unmanned aerial vehicle comprises a control center communicator;
   wherein
   the control center communicator is in a two-way communication with a communicator;
   the communicator is in a two-way communication with a docking station interaction system, a wireless communicator for interacting with the plurality of second unmanned aerial vehicles, and a second central processing unit, respectively;
   the second central processing unit is in a two-way communication with a flight controller, a wireless power receiver, and a second power supply, respectively;
   the second power supply is in a two-way communication with the wireless power receiver;
   the control center communicator is configured to communicate and interact with the control center;
   the docking station interaction system is configured to perform an information interaction with the first docking station;
   the communicator is configured to implement an information interaction with the control center, the plurality of docking stations, and the plurality of second unmanned aerial vehicles;
   the wireless communicator for interacting with the plurality of second unmanned aerial vehicles is configured to wirelessly communicate with the plurality of second unmanned aerial vehicles;
   the second central processing unit is configured to perform a functional implementation with the control center communicator, the docking station interaction system, the communicator, the wireless communicator for interacting with the plurality of second unmanned aerial vehicles, the flight controller, the wireless power receiver and the second power supply;
   the wireless power receiver, when in the alternating magnetic field, receives magnetic field energy received by a coil and converts the magnetic field energy into a stable DC voltage and a stable DC current through a signal conditioning unit to supply power to the second power supply; and
   the second power supply is configured to guarantee a charging process of a battery.

4. A priority-based wireless charging method applied to the shared wireless charging docking station according to claim 1, comprising the following steps:

step 1: enabling the first docking station to be in a standby mode;

step 2: when there is a charging request from the first unmanned aerial vehicle, performing an identification on the first unmanned aerial vehicle by the first docking station;

step 3: allowing the first unmanned aerial vehicle to be ready for landing if the identification succeeds;

step 4: determining, by the first docking station, whether there is a charging request from a third unmanned aerial vehicle; if there is no charging request from the third unmanned aerial vehicle, proceeding to step 5; if there is the charging request from the third unmanned aerial vehicle, keeping the first unmanned aerial vehicle and the third unmanned aerial vehicle from actually entering a landing mission or a subsequent mission, performing a priority level assessment, accepting an actual charging request from only one of the first unmanned aerial vehicle and the third unmanned aerial vehicle, regarding the other one of the first unmanned aerial vehicle and the third unmanned aerial vehicle as a non-ready-for-landing unmanned aerial vehicle, and proceeding to-step 5 if the charging request from the first unmanned aerial vehicle is accepted after the priority level assessment, wherein the non-ready-for-landing unmanned aerial vehicle performs an airborne time determination and chooses to queue up or fly to the adjacent docking station for charging; if the charging request from the third unmanned aerial vehicle is accepted after the priority level assessment, the first docking station updates a ready-for-landing instruction to enable the third unmanned aerial vehicle to enter a ready-for-landing state, and the non-ready-for-landing unmanned aerial vehicle performs the airborne time determination and chooses to queue up or fly to the adjacent docking station for charging;

step 5: allowing the first unmanned aerial vehicle to land in an effective region on the first docking station, and locking the first unmanned aerial vehicle by the connection actuator;

step 6: allowing the first unmanned aerial vehicle to turn off an engine of the first unmanned aerial vehicle, and wirelessly charging the first unmanned aerial vehicle by the first docking station; and step 7: allowing the first unmanned aerial vehicle to start the engine of the first unmanned aerial vehicle after the first unmanned aerial vehicle is fully charged, notifying the first docking station, allowing the first unmanned aerial vehicle to be ready for taking off, unlocking, by the first docking station, the connection actuator after the first docking station receives a notification, and allowing the first unmanned aerial vehicle to take off.

5. The priority-based wireless charging method according to claim 4, wherein
the priority level assessment is based on a residual battery level of the first unmanned aerial vehicle, a time required by full charge and a distance between the first unmanned aerial vehicle and the first docking station, wherein when the residual battery level decreases, a priority level of landing and charging increases; airborne batteries of the plurality of unmanned aerial vehicles vary in capacity, when the time decreases, the priority level increases, the distance is corrected by using a satellite positioning system comprising Beidou and/or GPS in conjunction with a signal strength in a wireless process between the first unmanned aerial vehicle and the first docking station; and when the distance decreases, the signal strength of the first docking station and the priority level increase.

6. The priority-based wireless charging method according to claim 4, wherein
in step 6, when there is a charging application from the third unmanned aerial vehicle, the third unmanned aerial vehicle directly performs the airborne time determination and chooses to queue up or fly to the adjacent docking station for charging.

7. The priority-based wireless charging method according to claim 4, wherein
the airborne time determination for the unmanned aerial vehicle comprises a first situation and a second situation, wherein
in the first situation, when a residual battery level is sufficient, the first unmanned aerial vehicle flies to the adjacent docking station for charging; and
in the second situation, when the first docking station and/or the first unmanned aerial vehicle determine/determines that the residual battery level of the first unmanned aerial vehicle is insufficient to support the first unmanned aerial vehicle to fly to the adjacent docking station, the first unmanned aerial vehicle chooses to land nearby, after landing, the first unmanned aerial vehicle stops main rotors or all rotors, the first unmanned aerial vehicle enters a standby state, the first unmanned aerial vehicle interacts with the first docking station in real time, and the first unmanned aerial vehicle applies for charging.

8. The priority-based wireless charging method according to claim 7, wherein
in the first situation, when the adjacent docking station interacts with the first docking station, an availability of the adjacent docking station is determined by three conditions comprising: whether the adjacent docking station is in a normal functional state, whether there is no unmanned aerial vehicle charging on the adjacent docking station, and whether the residual battery level of the first unmanned aerial vehicle is sufficient to support the first unmanned aerial vehicle to fly to the adjacent docking station, and
when the first unmanned aerial vehicle flies to the adjacent docking station satisfying the three conditions, repeating step 2 to step 7.

9. The priority-based wireless charging method according to claim 4, wherein
in step 3, when the identification of the first unmanned aerial vehicle fails over a preset maximum number of identification failures, the first docking station denies landing of the first unmanned aerial vehicle and requires the first unmanned aerial vehicle to leave.

10. The priority-based wireless charging method according to claim 4, wherein
in step 5, the connection actuator pushes the first unmanned aerial vehicle to the effective region, and when the first unmanned aerial vehicle fails to land in or partially lands within the effective region and the connection actuator fails, within a period of time, the first unmanned aerial vehicle takes off slightly and finely tunes a landing point through re-landing to land in the effective region; and
interaction between the first unmanned aerial vehicle and the first docking station is maintained during the period of time.

11. The shared wireless charging docking station according to claim 2, wherein the first unmanned aerial vehicle comprises a control center communicator;

wherein the control center communicator is in a two-way communication with a communicator;

the communicator is in a two-way communication with a docking station interaction system, a wireless communicator for interacting with the plurality of second unmanned aerial vehicles, and a second central processing unit, respectively;

the second central processing unit is in a two-way communication with a flight controller, a wireless power receiver, and a second power supply, respectively;

the second power supply is in a two-way communication with the wireless power receiver;

the control center communicator is configured to communicate and interact with the control center;

the docking station interaction system is configured to perform an information interaction with the first docking station;

the communicator is configured to implement an information interaction with the control center, the plurality of docking stations, and the plurality of second unmanned aerial vehicles;

the wireless communicator for interacting with the plurality of second unmanned aerial vehicles is configured to wirelessly communicate with the plurality of second unmanned aerial vehicles;

the second central processing unit is configured to perform a functional implementation with the control center communicator, the docking station interaction system, the communicator, the wireless communicator for interacting with the plurality of second unmanned aerial vehicles, the flight controller, the wireless power receiver and the second power supply;

the wireless power receiver, when in the alternating magnetic field, receives magnetic field energy received by a coil and converts the magnetic field energy into a stable DC voltage and a stable DC current through a signal conditioning unit to supply power to the second power supply; and the second power supply is configured to guarantee a charging process of a battery.

12. The priority-based wireless charging method according to claim 4, wherein the connection actuator moves from a vicinity of an edge of the first docking station in a two-dimensional manner and performs a parallel motion in a horizontal direction or a vertical direction to a vicinity of an edge of an effective region until the first unmanned aerial vehicle is caught and locked;

the connection actuator is further configured to remove snow and debris;

a stop position of the connection actuator is located on a side of the first docking station, wherein the side of the first docking station is opposite to a start position of the connection actuator; and the connection actuator moves in the horizontal direction and the vertical direction non-simultaneously.

13. The priority-based wireless charging method according to claim 4, wherein the first unmanned aerial vehicle comprises a control center communicator;

wherein the control center communicator is in a two-way communication with a communicator;

the communicator is in a two-way communication with a docking station interaction system, a wireless communicator for interacting with the plurality of second unmanned aerial vehicles, and a second central processing unit, respectively;

the second central processing unit is in a two-way communication with a flight controller, a wireless power receiver, and a second power supply, respectively;

the second power supply is in a two-way communication with the wireless power receiver;

the control center communicator is configured to communicate and interact with the control center;

the docking station interaction system is configured to perform an information interaction with the first docking station;

the communicator is configured to implement an information interaction with the control center, the plurality of docking stations, and the plurality of second unmanned aerial vehicles;

the wireless communicator for interacting with the plurality of second unmanned aerial vehicles is configured to wirelessly communicate with the plurality of second unmanned aerial vehicles;

the second central processing unit is configured to perform a functional implementation with the control center communicator, the docking station interaction system, the communicator, the wireless communicator for interacting with the plurality of second unmanned aerial vehicles, the flight controller, the wireless power receiver and the second power supply;

the wireless power receiver, when in the alternating magnetic field, receives magnetic field energy received by a coil and converts the magnetic field energy into a stable DC voltage and a stable DC current through a signal conditioning unit to supply power to the second power supply; and the second power supply is configured to guarantee a charging process of a battery.

14. The priority-based wireless charging method according to claim 12, wherein the first unmanned aerial vehicle comprises a control center communicator;

wherein the control center communicator is in a two-way communication with a communicator;

the communicator is in a two-way communication with a docking station interaction system, a wireless communicator for interacting with the plurality of second unmanned aerial vehicles, and a second central processing unit, respectively;

the second central processing unit is in a two-way communication with a flight controller, a wireless power receiver, and a second power supply, respectively;

the second power supply is in a two-way communication with the wireless power receiver;

the control center communicator is configured to communicate and interact with the control center;

the docking station interaction system is configured to perform an information interaction with the first docking station;

the communicator is configured to implement an information interaction with the control center, the plurality of docking stations, and the plurality of second unmanned aerial vehicles;

the wireless communicator for interacting with the plurality of second unmanned aerial vehicles is configured to wirelessly communicate with the plurality of second unmanned aerial vehicles;

the second central processing unit is configured to perform a functional implementation with the control center communicator, the docking station interaction system, the communicator, the wireless communicator for interacting with the plurality of second unmanned aerial vehicles, the flight controller, the wireless power receiver and the second power supply;

the wireless power receiver, when in the alternating magnetic field, receives magnetic field energy received by a coil and converts the magnetic field energy into a stable DC voltage and a stable DC current through a signal conditioning unit to supply power to the second power-supply; and the second power supply is configured to guarantee a charging process of a battery.

15. The priority-based wireless charging method according to claim 12, wherein
the priority level assessment is based on a residual battery level of the first unmanned aerial vehicle, a time required by full charge and a distance between the first unmanned aerial vehicle and the first docking station, wherein when the residual battery level decreases, a priority level of landing and charging increases; airborne batteries of the plurality of unmanned aerial vehicles vary in capacity, when the time decreases, the priority level increases, the distance is corrected by using a satellite positioning system comprising Beidou and/or GPS in conjunction with a signal strength in a wireless process between the first unmanned aerial vehicle and the first docking station; and when the distance decreases, the signal strength of the first docking station and the priority level increase.

16. The priority-based wireless charging method according to claim 13, wherein
the priority level assessment is based on a residual battery level of the first unmanned aerial vehicle, a time required by full charge and a distance between the first unmanned aerial vehicle and the first docking station, wherein when the residual battery level decreases, a priority level of landing and charging increases; airborne batteries of the plurality of unmanned aerial vehicles vary in capacity, when the time decreases, the priority level increases, the distance is corrected by using a satellite positioning system comprising Beidou and/or GPS in conjunction with a signal strength in a wireless process between the first unmanned aerial vehicle and the first docking station; and when the distance decreases, the signal strength of the first docking station and the priority level increase.

17. The priority-based wireless charging method according to claim 14, wherein
the priority level assessment is based on a residual battery level of the first unmanned aerial vehicle, a time required by full charge and a distance between the first unmanned aerial vehicle and the first docking station, wherein when the residual battery level decreases, a priority level of landing and charging increases; airborne batteries of the plurality of unmanned aerial vehicles vary in capacity, when the time decreases, the priority level increases; the distance is corrected by using a satellite positioning system comprising Beidou and/or GPS in conjunction with a signal strength in a wireless process between the first unmanned aerial vehicle and the first docking station; and when the distance decreases, the signal strength of the first docking station and the priority level increase.

18. The priority-based wireless charging method according to claim 12, wherein
in step 6, when there is a charging application from the third unmanned aerial vehicle, the third unmanned aerial vehicle directly performs the airborne time determination and chooses to queue up or fly to the adjacent docking station for charging.

19. The priority-based wireless charging method according to claim 13, wherein
in step 6, when there is a charging application from the third unmanned aerial vehicle, the third unmanned aerial vehicle directly performs the airborne time determination and chooses to queue up or fly to the adjacent docking station for charging.

20. The priority-based wireless charging method according to claim 14, wherein
in step 6, when there is a charging application from the third unmanned aerial vehicle, the third unmanned aerial vehicle directly performs the airborne time determination and chooses to queue up or fly to the adjacent docking station for charging.

* * * * *